United States Patent
Iriyama

(10) Patent No.: US 9,165,024 B2
(45) Date of Patent: Oct. 20, 2015

(54) MANAGEMENT APPARATUS AND MANAGEMENT METHOD

(71) Applicant: FUJITSU LIMITED, Kawasaki-shi, Kanagawa (JP)

(72) Inventor: Yasuomi Iriyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 263 days.

(21) Appl. No.: 13/908,420

(22) Filed: Jun. 3, 2013

(65) Prior Publication Data

US 2014/0006360 A1    Jan. 2, 2014

(30) Foreign Application Priority Data

Jul. 2, 2012   (JP) .................................. 2012-148910

(51) Int. Cl.
   *G06F 17/30* (2006.01)

(52) U.S. Cl.
   CPC .... *G06F 17/30371* (2013.01); *G06F 17/30115* (2013.01); *G06F 17/3007* (2013.01); *G06F 17/30067* (2013.01); *G06F 17/30091* (2013.01); *G06F 17/30117* (2013.01); *G06F 17/30171* (2013.01); *Y10S 707/99931* (2013.01); *Y10S 707/99938* (2013.01); *Y10S 707/99951* (2013.01); *Y10S 707/99952* (2013.01)

(58) Field of Classification Search
   CPC .......... G06F 17/30067; G06F 17/3007; G06F 17/30073; G06F 17/30091; G06F 17/30115; G06F 17/30117; G06F 17/30129; G06F 17/30171; Y10S 707/99931; Y10S 707/99938; Y10S 707/99951; Y10S 707/99952
   See application file for complete search history.

(56) References Cited

U.S. PATENT DOCUMENTS

| | | | | |
|---|---|---|---|---|
| 6,687,716 | B1 * | 2/2004 | Bradley .......................... | 707/822 |
| 6,751,635 | B1 * | 6/2004 | Chen et al. ............................ | 1/1 |
| 7,546,319 | B1 * | 6/2009 | Srinivasan et al. .................... | 1/1 |
| 8,504,597 | B2 * | 8/2013 | Pitts .............................. | 707/827 |

FOREIGN PATENT DOCUMENTS

| | | |
|---|---|---|
| JP | 6-68183 | 3/1994 |
| JP | 2000-305949 | 11/2000 |
| JP | 2006/107215 | 4/2006 |

* cited by examiner

*Primary Examiner* — Cheryl Lewis
(74) *Attorney, Agent, or Firm* — Staas & Halsey LLP

(57) ABSTRACT

A management apparatus includes a processor coupled to a memory. The processor is configured to identify, in a case that a first file is updated or deleted, a second file that has a reference relation with the first file by referring to correspondence information indicating a correspondence between a referred-to-by file and a referred-to file, and check consistency between the second file and the first file.

12 Claims, 16 Drawing Sheets

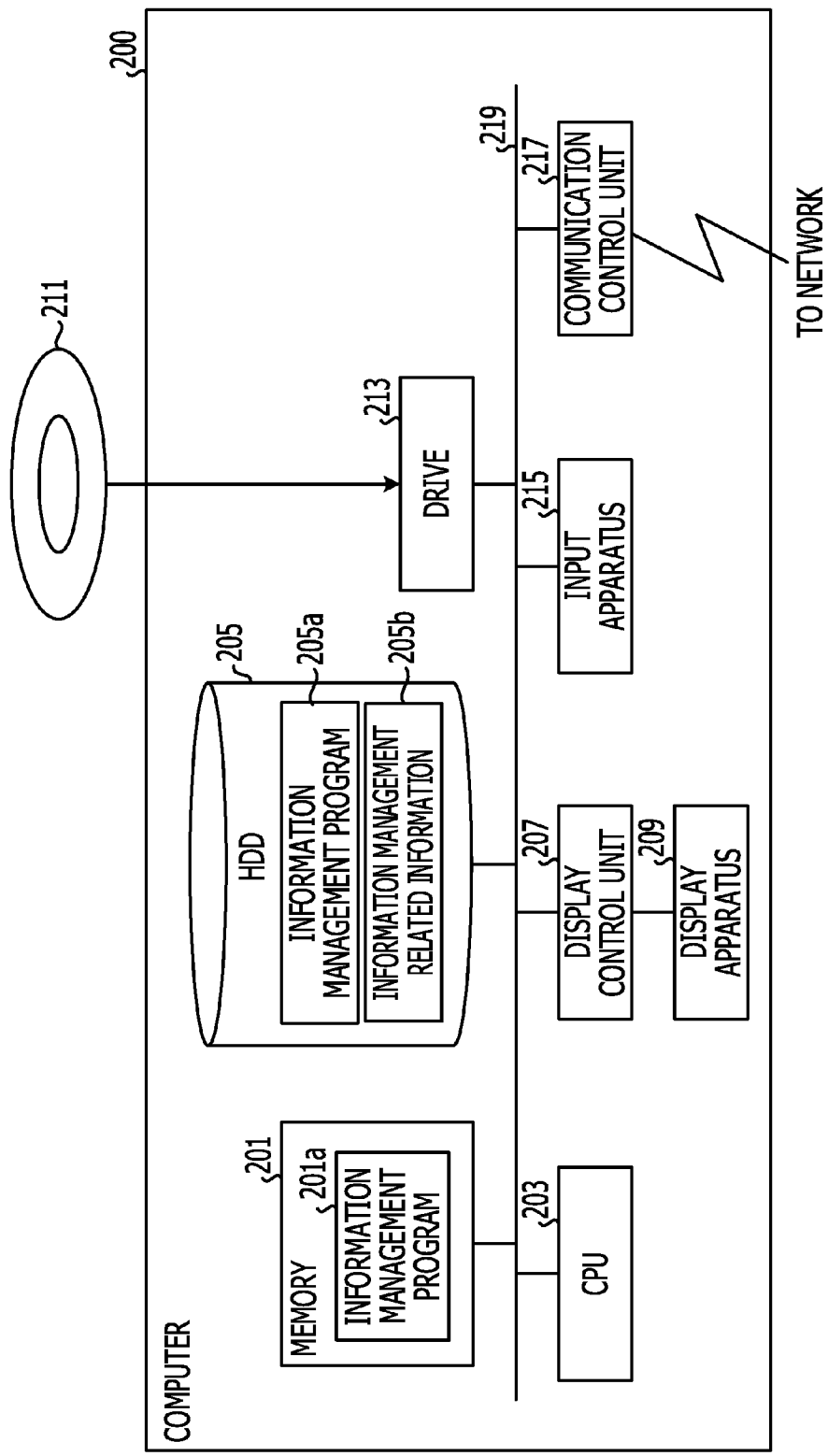

MANAGEMENT APPARATUS AND MANAGEMENT METHOD

CROSS-REFERENCE TO RELATED APPLICATION

This application is based upon and claims the benefit of priority from the prior Japanese Patent Application No. 2012-148910 filed on Jul. 2, 2012, the entire contents of which are incorporated herein by reference.

FIELD

This embodiments discussed herein are related to management of information.

BACKGROUND

In some cases, a definition or information of a document includes a relation among a plurality of files. For example, in the case of extensible markup language (XML) files, a relation between files is defined by describing an Xlink indicating a linked-to file in a linked-from file.

When a content of an XML file is updated, an information management system that manages XML files exclusively locks all files related to the XML file to be updated, and the information management system analyzes all exclusively locked files to check consistency between the file to be updated and the related files. If the check indicates good consistency, the information management system updates the content of the file. More detailed information about this technique may be found, for example, in Japanese Laid-open Patent Publication No. 2006-107215.

However, the processing load in checking the consistency between the file to be updated and related files increases with the total number of related files. That is, because the information management system analyzes all related files to check the consistency between the file to be updated and the related files, the processing load of checking the consistency increases with the number of files.

Note that not only when a file is updated, but when a file is deleted, a similar problem may occur.

SUMMARY

According to an aspect of the invention, a management apparatus includes a processor coupled to a memory and configured to identify, in a case that a first file is updated or deleted, a second file that has a reference relation with the first file by referring to correspondence information indicating a correspondence between a referred-to-by file and a referred-to file, and check consistency between the second file and the first file.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 16 illustrates an example of a computer configured to execute an information management program.

DESCRIPTION OF EMBODIMENTS

A program, an image management apparatus, and an information management method according to embodiments are described in detail below with reference to drawings. In the following description, an embodiment is applied to, by way of example, an image management apparatus configured to manage information formed by a plurality of XML files related to each other. Note that the embodiment is not limited to the example described below.

Figure 1:
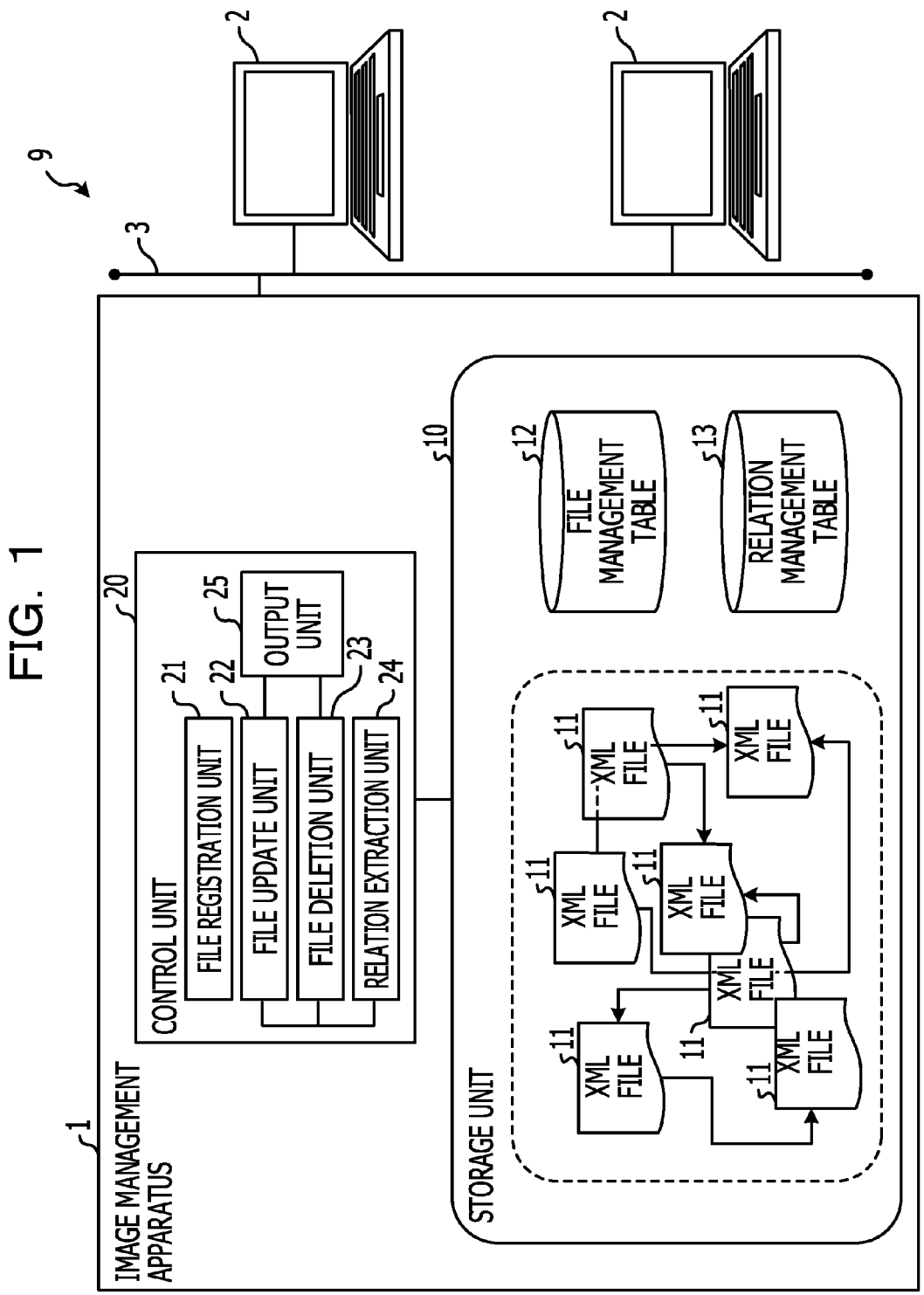
FIG. 1 illustrates an example of a configuration of an information management system.

FIG. 1 is a functional block diagram illustrating a configuration of an information management system according to an embodiment. As illustrated in FIG. 1, the information management system 9 includes an image management apparatus 1 and a plurality of user terminals 2. The image management apparatus 1 is coupled to the plurality of user terminals 2 via a local area network (LAN) 3.

The image management apparatus 1 includes a storage unit 10 and a control unit 20.

The storage unit 10 may be, for example, a nonvolatile semiconductor memory such as a flash memory, a Ferroelectric Random Access Memory (FRAM®), or the like. The storage unit 10 includes a plurality of XML files 11, a file management table 12, and a relation management table 13.

The XML file 11 is an entity of a file described in XML and mutually related to another XML file 11. For example, one piece of definition information or one document or the like is formed by a plurality of XML files 11 related to each other. In a case where the files related to each other are XML files 11, a mutual relation between XML files 11 is defined by Xlink. For example, a relation between a referred-to-by XML file 11 and a referred-to XML file 11 is defined by describing Xlink in the referred-to-by XML file 11 such that the Xlink points to a URL of the referred-to XML file 11. In the example illustrated in FIG. 1, for convenience of illustration, arrows are used to indicate relations between XML files 11. That is, each referred-to-by XML file 11 is at the tail of an arrow, and a URL of an XML file 11 at the head of the arrow is described in Xlink in the referred-to-by XML file 11. Relations between XML files 11 are managed by the relation management table 13 as described later.

The file management table 12 stores uniform resource locators (URLs) according to which the image management apparatus 1 accesses the XML files 11. The relation management table 13 also stores information about relations between XML files 11. Data structures of the file management table 12 and the relation management table 13 will be described later.

The control unit 20 includes an internal memory for storing programs defining various processes and control data, and the control unit 20 performs various processes using the programs and the control data. The control unit 20 may be an integrated circuit such as an application specific integrated circuit (ASIC), a field programmable gate array (FPGA), or the like or an electronic circuit such as a central processing unit (CPU), a micro-processing unit (MPU), or the like. The control unit 20 further includes a file registration unit 21, a file update unit 22, a file deletion unit 23, a relation extraction unit 24, and an output unit 25.

When an XML file 11 is registered, the file registration unit 21 registers a URL of the file registration unit 21 in the file management table 12. The file registration unit 21 analyzes the XML file 11 to be registered to extract a relation to another XML file 11. More specifically, for example, the file registration unit 21 analyzes Xlink described in the XML file 11 to be registered and extracts the relation to another XML file 11. The file registration unit 21 registers the extracted relation in the relation management table 13.

Figure 2:
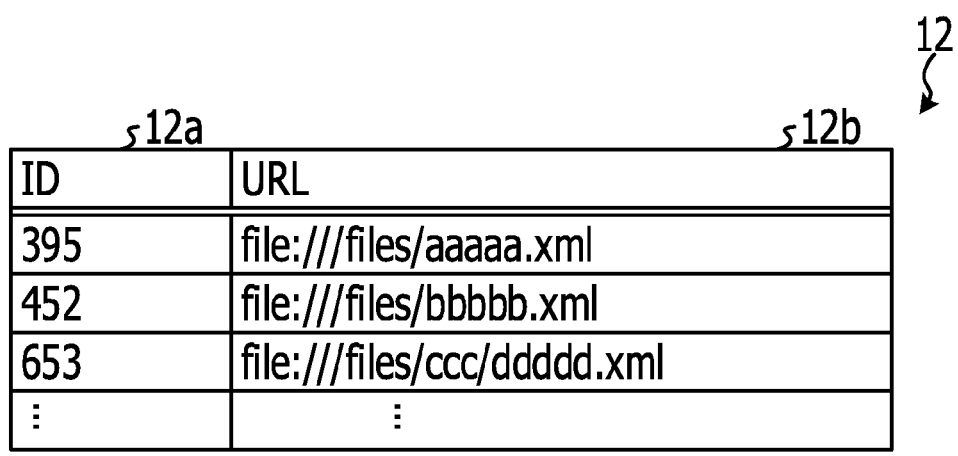
FIG. 2 illustrates an example of a data structure of a file management table.
Figure 3:
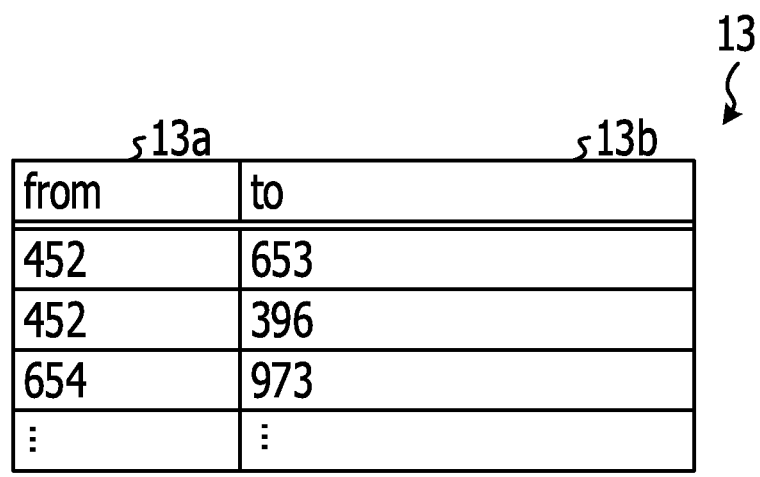
FIG. 3 illustrates an example of a data structure of a relation management table.

Next, the data structures of the file management table 12 and the relation management table 13 are described below with reference to FIG. 2 and FIG. 3. FIG. 2 is a diagram illustrating an example of a data structure of the file management table according to an embodiment. FIG. 3 is a diagram illustrating an example of a data structure of the relation management table according to an embodiment.

As illustrated in FIG. 2, the file management table 12 stores an identification (ID) 12a in association with a corresponding URL 12b. IDs 12a are identification numbers identifying respective XML files 11. IDs 12a are automatically assigned to respective XML files 11 such that each XML file 11 has a uniquely assigned ID 12a different from any other IDs 12a. URLs 12b indicate locations of entities of the XML files 11. For example, in FIG. 2, for an ID 12a of "395", "file:///files/aaaaa.xml" is stored as an associated URL 11b.

As illustrated in FIG. 3, the relation management table 13 stores "from" 13a in association with "to" 13b. A value of each "from" 13a indicates an ID of a referred-to-by XML file 11. A value of each "to" 13b indicates an ID of a referred-to XML file 11. That is, Xlink pointing to the XML file 11 indicated by "to" 13b is described in the XML file 11 indicated by "from" 13a. For example, "653" and "396" are registered as values of "to" 13b in association with "from" 13a of "452". A relation from "from" 13a to "to" 13b is referred to as a "forward relation", and a relation from "to" 13b to "from" 13a is referred to as a "reverse relation".

When a particular XML file 11 is updated, the file update unit 22 identifies an XML file 11 that will be affected by the updating of the XML file 11. After the consistency between the particular file to be updated and the identified XML file 11 is confirmed, the file update unit 22 updates the particular XML file 11 specified to be updated. The process of identifying the XML file 11 that will be affected is performed by the relation extraction unit 24 that will be described below.

More specifically, for example, the file update unit 22 exclusively locks XML files 11 in a range narrowed by the relation extraction unit 24, and the file update unit 22 checks the consistency of data on the exclusively locked XML files 11. If the checking indicates good data consistency, the file update unit 22 updates the particular XML file 11 specified to be updated. Furthermore, the file update unit 22 extracts a relation between a part, to be updated, of the particular file XML file 11 and other XML files 11. If a relation is extracted, then the file update unit 22 updates the relation management table 13. The file update unit 22 then releases the exclusive lock of the XML files 11 in the narrowed range. On the other hand, in a case where the checking of the data consistency indicates inconsistency, the file update unit 22 outputs information indicating a reason for the inconsistency via the output unit 25 described later.

When a particular XML file 11 is deleted, the file deletion unit 23 identifies an XML file 11 that will be affected by the deleting of the particular XML file 11. After the consistency of the identified XML file 11 is confirmed, the file deletion unit 23 deletes the particular XML file 11 specified to be deleted. Note that the process of identifying XML files 11 that will be affected is performed by the relation extraction unit 24 as described later.

More specifically, for example, the file deletion unit 23 exclusively locks XML files 11 in a range narrowed by the relation extraction unit 24, and the file deletion unit 23 checks the data consistency. If the checking indicates good data consistency, the file deletion unit 23 deletes a record, corresponding to the particular XML file 11 specified to be deleted, from the relation management table 13. That is, when the ID of the particular XML file 11 specified to be deleted is described in "from" 13a or "to" 13b in the relation management table 13, the file deletion unit 23 deletes a record in which the ID is described. The file deletion unit 23 then deletes a record, corresponding to the particular XML file 11 specified to be deleted, from the file management table 12. The file deletion unit 23 then deletes the particular XML file 11 specified to be deleted. Furthermore, the file deletion unit 23 releases the exclusive lock of the XML files 11 in the narrowed range. On the other hand, in a case where the checking of the data consistency indicates inconsistency, the file deletion unit 23 outputs information indicating a reason for the inconsistency via the output unit 25 described later.

Based on relations among the XML files 11 described in the relation management table 13, the relation extraction unit 24 identifies XML files 11 that will be affected by the updating of the particular XML file 11 specified to be updated. Based on relations among the XML files 11 described in the relation management table 13, the relation extraction unit 24 identifies XML files 11 that will be affected by the deleting of the XML file 11 specified to be deleted. For example, the relation extraction unit 24 extracts related IDs which are related to an ID of the XML file 11 specified to be updated or deleted (hereinafter, referred to as the XML file 11 to be processed or the to-be-processed XML file 11) from the relation management table 13 based on the ID of the to-be-processed XML file 11. More specifically, for example, the relation extraction unit 24 extracts related IDs indicated in "to" 13b related, in the relation management table 13, to "from" 13a in which the ID of the to-be-processed XML file 11 is described, that is, the relation extraction unit 24 extracts forward related IDs. Furthermore, the relation extraction unit 24 extracts related IDs indicated in "from" 13a related, in the relation management table 13, to "to" 13b in which the ID of the to-be-processed XML file 11 is described, that is, the relation extraction unit 24 extracts reverse related IDs. The relation extraction unit 24 then selects a forward related ID and a reverse related ID one by one from the extracted forward related IDs and reverse related IDs, and further extracts related IDs from the relation management table 13 by performing a recursive extraction based on the selected IDs. That is, the relation extraction unit 24 extracts not only related IDs directly related to the ID of the to-be-processed XML file 11 but also related IDs indirectly related to the ID of the to-be-processed XML file 11. The relation extraction unit 24 then adds the extracted related IDs as members of a related ID group, for example, to a related ID group list. The related IDs in the added related ID group list are IDs of XML files 11 that will be affected by the to-be-processed XML file 11. An example of a configuration of the related ID group list will be described later.

In a case where the file update unit 22 determines that data consistency is not valid, the output unit 25 outputs information indicating a reason for the inconsistency to a user terminal 2 that is an issuer of the file update request. In a case where the file deletion unit 23 determines that the data consistency is not valid, the output unit 25 outputs information indicating a reason for the inconsistency to a user terminal 2 that is an issuer of the file delete request. In a case where the file is successfully updated by the file update unit 22, the output unit 25 outputs information indicating the completion of successful updating to a user terminal 2 that is an issuer of the file update request. In a case where the file is successfully deleted by the file deletion unit 23, the output unit 25 outputs information indicating the completion of successful deleting to a user terminal 2 that is an issuer of the file delete request.

Figure 4:
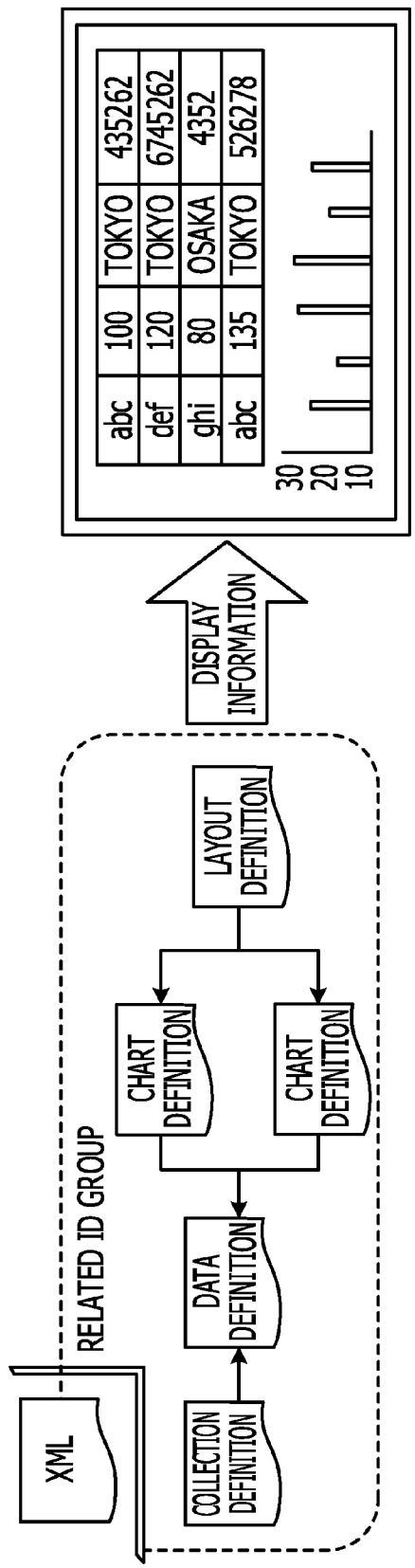
FIG. 4 illustrates an example of a relation among XML files.
Figure 5:
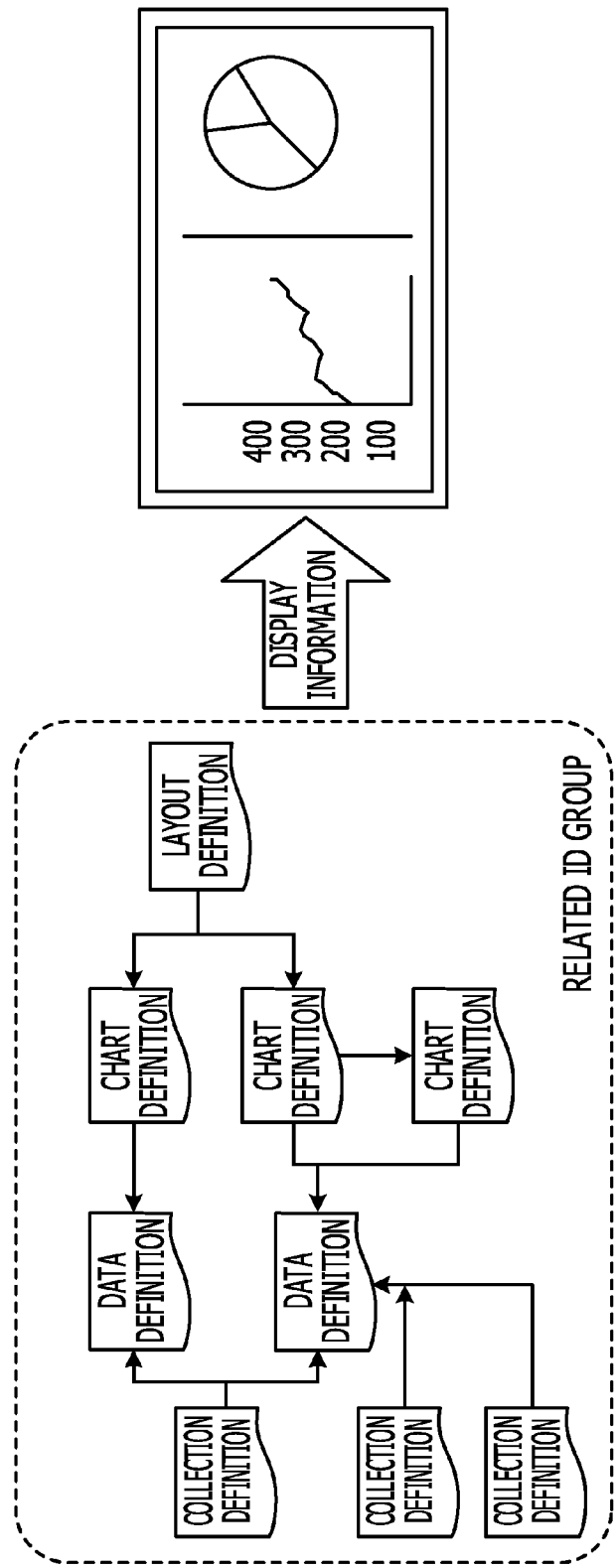
FIG. 5 illustrates another example of a relation among XML files.

Specific examples of relations between XML files 11 are described below with reference to FIG. 4 and FIG. 5. FIG. 4 is a diagram illustrating a specific example of a relation between XML files. FIG. 5 is a diagram illustrating another specific example of a relation between XML files.

As illustrated in a left-hand part of FIG. 4, a plurality of related XML files 11 are included in a related ID group. The related ID group includes XML files 11 of a collection definition, a data definition, a chart definition, and a layout definition, which are related to each other. Herein it is assumed that the data definition defines a schema of data. The collection definition defines data to be collected, and the collection definition refers to the data definition. That is, the collection definition is a referred-to-by file and the data definition is a referred-to file, and thus there is a forward relation from the collection definition to the data definition, and there is a reverse relation from the data definition to the collection definition. The chart definition defines a display format of a chart, and the data definition is referred to in each chart definition. That is, each chart definition is a referred-to-by file and the data definition is a referred-to file, and thus there is a forward relation from the chart definition to the data definition, and there is a reverse relation from the data definition to the chart definition. The layout definition defines a layout of the chart and the chart definitions are referred to in the layout definition. That is the layout definition is a referred-to-by file, and the chart definition is a referred-to file, and thus there is a forward relation from the layout definition to the chart definition, and there is a reverse relation from the chart definition to the layout definition.

One piece of information is formed as a whole based on all definitions included in the related ID group. As illustrated in a right-hand part of FIG. 4, the chart whose layout is defined by the layout definition is displayed in the display format defined by the chart definition. That is, data defined by the data definition is collected according to the collection definition, and a result is displayed in the chart.

In another example illustrated in FIG. 5, a plurality of XML files 11 related to each other are included in a related ID group as illustrated in a left-hand part of FIG. 5. The related ID group includes, as with the related ID group illustrated in FIG. 4, XML files 11 of a collection definition, a data definition, a chart definition, and a layout definition, which are related to each other.

One piece of information is formed as a whole based on all definitions included in the related ID group. As illustrated in a right-hand part of FIG. 5, the chart whose layout is defined by the layout definition is displayed in the display format defined by the chart definition. That is, data defined by the data definition is collected according to the collection definition, and a result is displayed in the chart.

Figure 6:
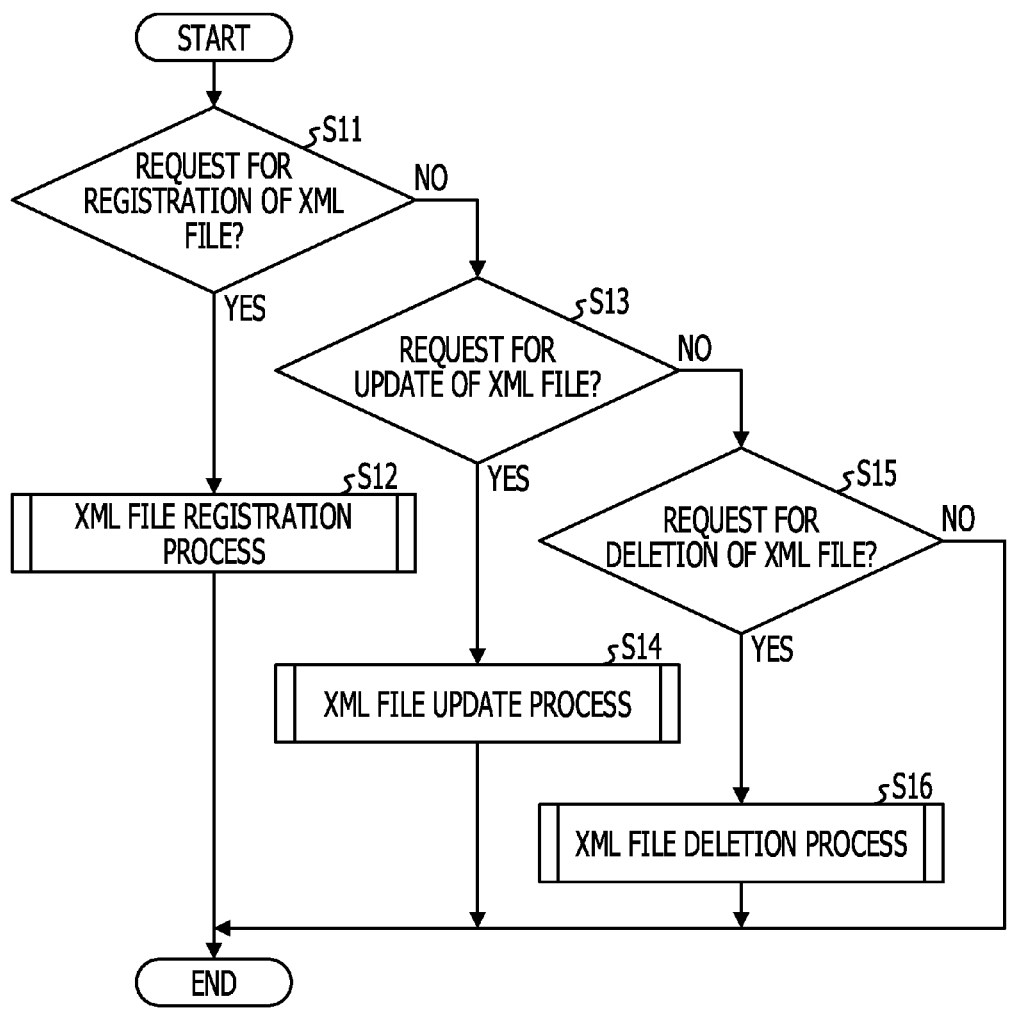
FIG. 6 is an exemplary flow chart illustrating a whole procedure of an information management process.

Next, a whole procedure of the information management process according to an embodiment is described below with reference to FIG. 6. FIG. 6 is a flow chart illustrating the whole process of the information management process according to the embodiment. When the image management apparatus 1 accepts some request, the information management process is performed as follows.

First, the control unit 20 determines whether the accepted request is a request for registration of a XML file 11 (S11). In a case where it is determined that the accepted request is a request for registration of a XML file 11 (that is, when the answer to S11 is Yes), the file registration unit 21 performs a process of registering the XML file 11 (S12). Thereafter, the control unit 20 ends the information management process.

On the other hand, in a case where it is determined that the accepted request is not a request for registration of a XML file 11 (that is, when the answer to S11 is No), the control unit 20 determines whether the accepted request is a request to update a XML file 11 (S13). In a case where it is determined that the accepted request is a request to update a XML file 11 (that is, when the answer to S13 is Yes), the file update unit 22 performs a process of updating the XML file 11 (S14). Thereafter, the control unit 20 ends the information management process.

On the other hand, in a case where it is determined that the accepted request is not a request to update a XML file 11 (that is, when the answer to S13 is No), the control unit 20 determines whether the accepted request is a request to delete a XML file 11 (S15). In a case where it is determined that the accepted request is a request to delete a XML file 11 (that is, when the answer to S15 is Yes), the file deletion unit 23 performs a process of deleting the XML file 11 (S16). Thereafter, the control unit 20 ends the information management process.

On the other hand, in a case where it is determined that the accepted request is not a request to delete a XML file 11 (that is, when the answer to S15 is No), the control unit 20 ends the information management process.

Figure 7:
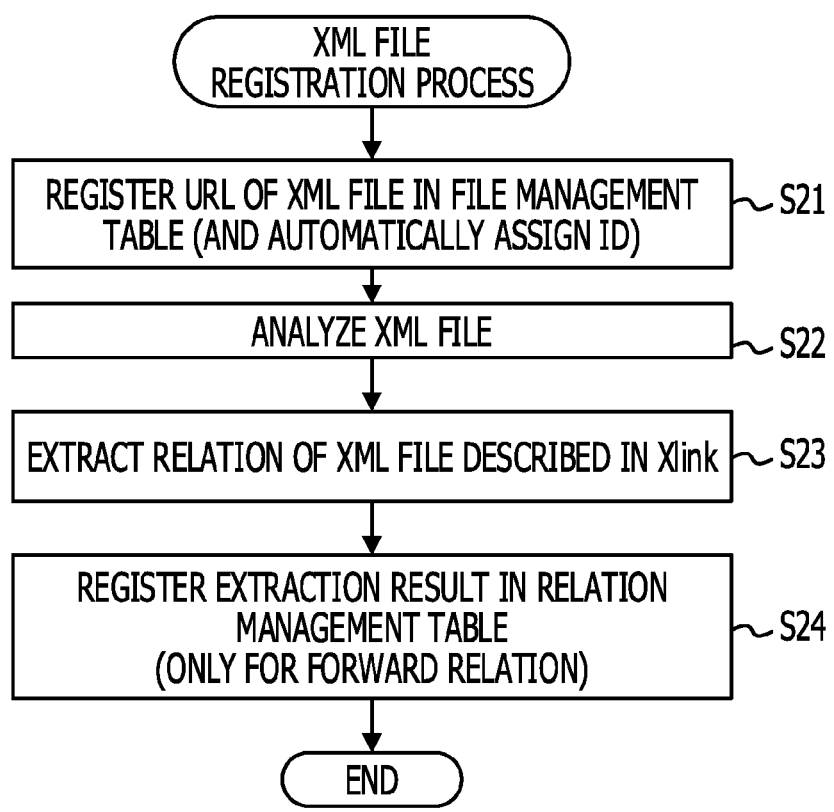
FIG. 7 is an exemplary flow chart illustrating a procedure of a file registration process.

Next, a procedure of the process of registering a XML file in S12 in FIG. 6 is described below with reference to FIG. 7. FIG. 7 is a flow chart illustrating the procedure of the file registration process.

First, the file registration unit 21 acquires a URL of a XML file 11 to be registered from the control unit 20, and the file registration unit 21 registers the acquired URL of the XML file 11 in the file management table 12 (S21). In this process, the file registration unit 21 automatically assign an ID to the XML file 11 to be registered such that the ID has a unique number different from that of any other ID, and the file registration unit 21 registers the assigned ID together with the URL in the file management table 12.

The file registration unit 21 then analyzes the XML file 11 to be registered (S22) and extracts the relation to other XML files 11 defined in Xlink (S23). The file registration unit 21 registers the extracted relation of the XML file 11 in the relation management table 13 (S24). More specifically, the file registration unit 21 registers the ID of the XML file 11 to be registered as a referred-to-by file in relation to the ID of a referred-to XML file 11 in the relation management table 13. Note that in this step, only a forward relation is registered as the relation of the XML file 11. Thereafter, the file registration unit 21 ends the process of registering the XML file 11.

Figure 8:
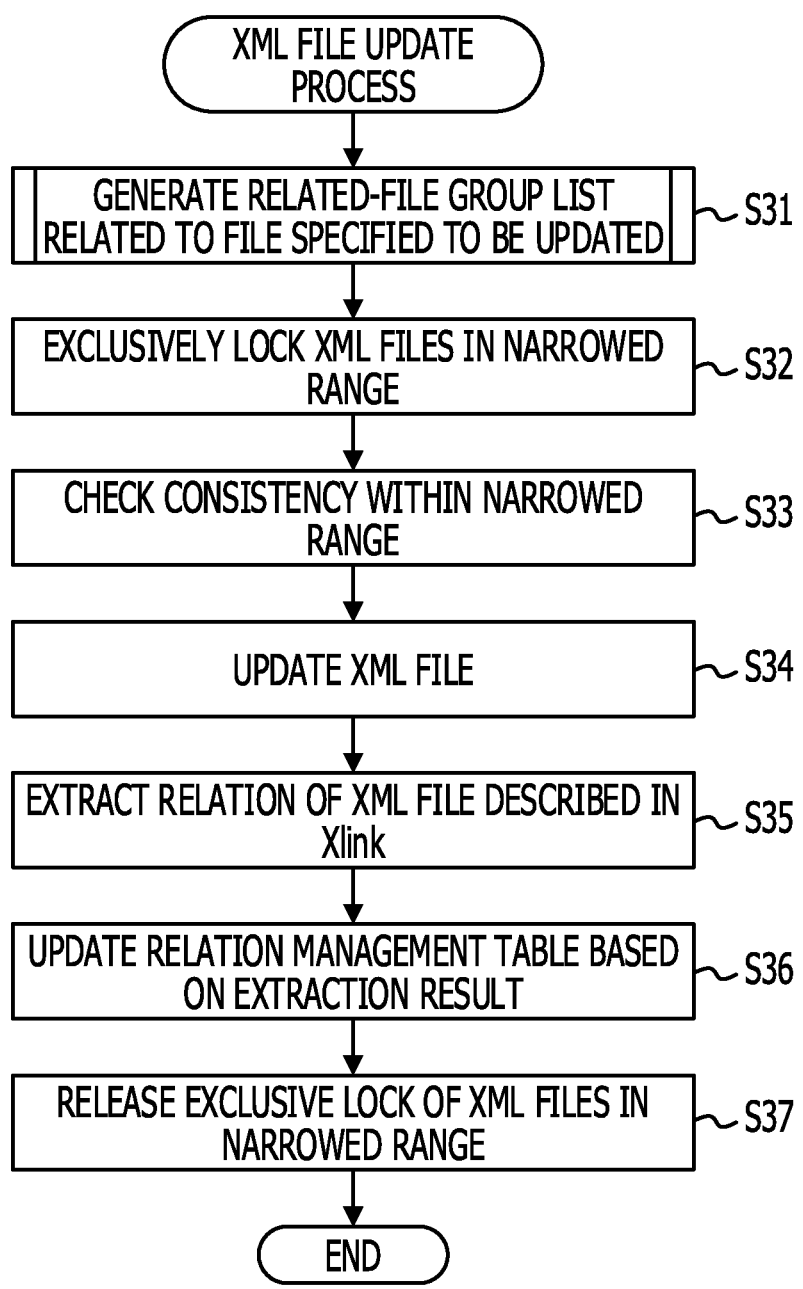
FIG. 8 is an exemplary flow chart illustrating a procedure of a file update process.

Next, a procedure of the process of updating a XML file in S14 in FIG. 6 is described below with reference to FIG. 8. FIG. 8 is a flow chart illustrating the procedure of the file updating process.

First, the file update unit 22 acquires a URL of a XML file 11 to be updated from the control unit 20. Note that there may be only one XML file 11 or two or more XML files 11 to be updated.

The file update unit 22 then performs a process of generating a related ID group list associated with the XML file 11 indicated by the acquired URL (S31). By generating the related ID group list associated with the XML file 11 specified to be updated, a range in which XML files 11 will be found that will be affected by the updating of the to-be-processed XML file 11 is narrowed. That is, XML files 11 in the narrowed range are registered in the related ID group list.

The file update unit 22 then exclusively locks the XML files 11 in the narrowed range based on the related ID group list (S32). More specifically, for example, the file update unit 22 exclusively locks XML files 11 indicated by related IDs included in the related ID group list (including the ID of the XML file 11 specified to be updated, in this case).

The file update unit 22 then checks the consistency within the narrowed range (S33). More specifically, for example, the file update unit 22 checks the consistency as to whether an XML file 11 referred to by the XML file 11 to be updated exists in the exclusively locked XML files 11. Furthermore, the file update unit 22 checks the consistency as to whether there is data of the XML file 11 referred to by the XML file 11 to be updated in the exclusively locked XML files 11. For example, when a display format of one of charts included in the chart definition illustrated in FIG. 4 is updated, the file update unit 22 checks the consistency as to whether data defined in the display format to be updated is defined in the data definition. On the other hand, for example, when a schema of data included in the data definition in FIG. 4 is updated, the file update unit 22 checks the consistency as to whether data defined in the schema to be updated is defined in the data definition is defined as data to be collected in the collection definition. In a case where the checking of the consistency indicates inconsistency, the file update unit 22 outputs information indicating a reason for the inconsistency to a user terminal 2 that is an issuer of the update request.

If the checking indicates good data consistency, the file update unit 22 updates the XML file 11 specified to be updated (S34). The file update unit 22 then extracts a relation defined by Xlink of the XML file 11 specified to be updated (S35). For example, when a part to be updated in the XML file 11 includes Xlink pointing to another XML file 11 as a referred-to file, the file update unit 22 extracts a relation to the XML file 11 pointed to as the referred-to file.

The file update unit 22 then updates the relation management table 13 in terms of the extracted relation of the XML file 11 (S36). More specifically, the file update unit 22 updates the relation management table 13 by describing the ID of the XML file 11 specified to be updated as a referred-to-by file in association with the ID of the referred-to XML file 11.

Thereafter, the file update unit 22 releases the exclusive lock of the XML files 11 in the narrowed range based on the related ID group list (S37). More specifically, for example, the file update unit 22 releases the exclusive lock of the XML files 11 indicated by the related IDs included in the related ID group list (including the ID of the XML file 11 specified to be updated, in this case). The file update unit 22 then outputs information indicating the successful completion of updating to a user terminal 2 that is an issuer of the update request, and ends the process of updating the XML file 11.

Figure 9:
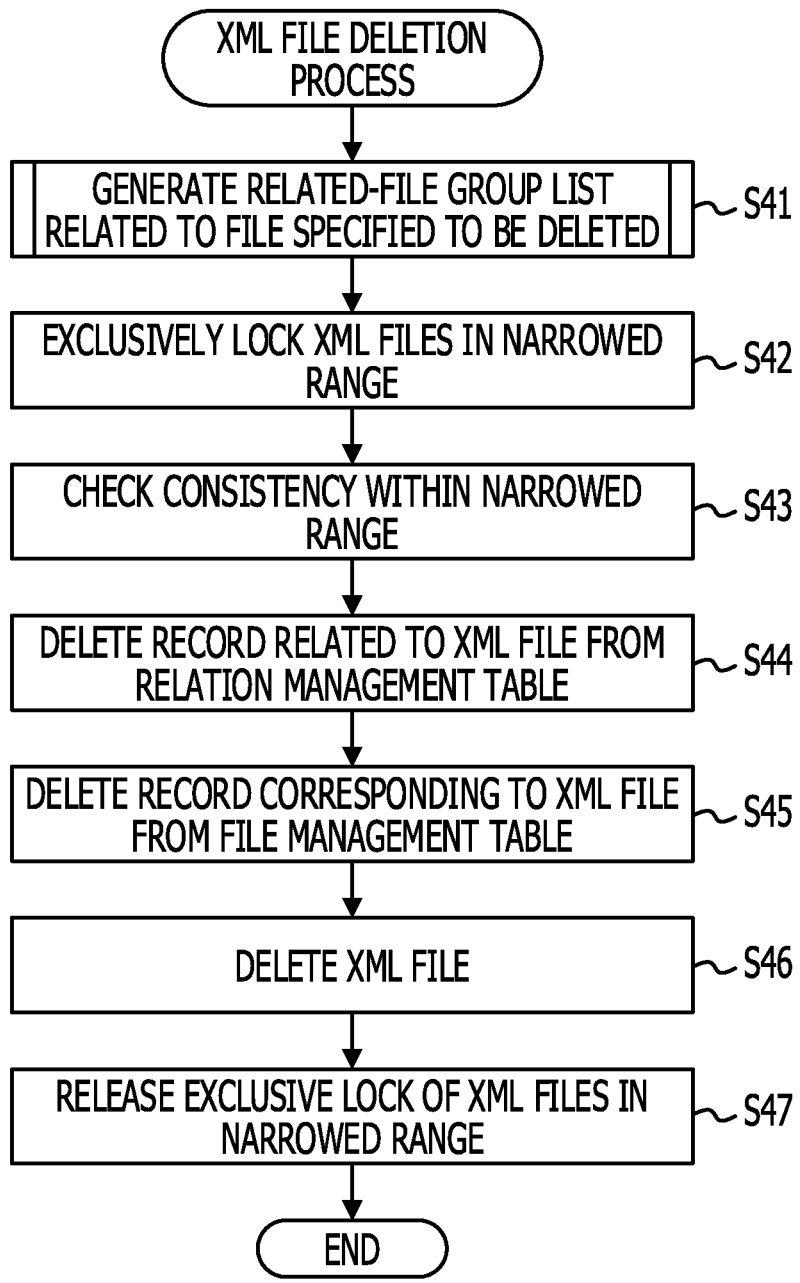
FIG. 9 is an exemplary flow chart illustrating a procedure of a file deletion process.

Next, a procedure of the process of deleting a XML file in S16 in FIG. 6 is described below with reference to FIG. 9. FIG. 9 is a flow chart illustrating the procedure of the file deletion process.

First, the file deletion unit 23 acquires a URL of a XML file 11 to be deleted from the control unit 20. Note that there may be only one XML file 11 or two or more XML files 11 to be deleted.

The file deletion unit 23 then performs a process of generating a related ID group list associated with the XML file 11 to be deleted indicated by the acquired URL (S41). By generating the related ID group list associated with the XML file 11 specified to be deleted, a range in which XML files 11 will be found that will be affected by the deleting of the XML file 11 specified to be deleted is narrowed. That is, XML files 11 in the narrowed range are registered in the related ID group list.

The file deletion unit 23 then exclusively locks the XML files 11 in the narrowed range based on the related ID group list (S42). More specifically, for example, the file deletion unit 23 exclusively locks XML files 11 indicated by related IDs included in the related ID group list (including the ID of the XML file 11 specified to be deleted, in this case).

The file deletion unit 23 then checks the consistency within the narrowed range (S43). More specifically, for example, the file deletion unit 23 checks the consistency as to whether an XML files 11 referred to by the XML file 11 to be deleted exists in the exclusively locked XML files 11. For example, in a case where one of the chart definitions illustrated in FIG. 4 is deleted, the file deletion unit 23 checks the consistency as to whether there is a definition in which the chart definition to be deleted is referred to. In a case where the checking of the consistency indicates inconsistency, the file deletion unit 23 outputs information indicating a reason for the inconsistency to a user terminal 2 that is an issuer of the delete request.

If the checking indicates good data consistency, the file deletion unit 23 deletes a record, associated with the XML file 11 to be deleted, from the relation management table 13 (S44). The file deletion unit 23 then deletes a record, corresponding to the XML file 11 specified to be deleted, from the file management table 12. (S45). Thereafter, the file deletion unit 23 deletes the XML file 11 specified to be deleted (S46).

Thereafter, the file deletion unit 23 releases the exclusive lock of the XML files 11 in the narrowed range based on the related ID group list (S47). More specifically, for example, the file deletion unit 23 releases the exclusive lock of the XML files 11 indicated by the related IDs included in the related ID group list. The file deletion unit 23 then outputs information indicating the successful completion of deleting to a user terminal 2 that issued the delete request, and ends the process of deleting the XML file 11.

Figure 10:
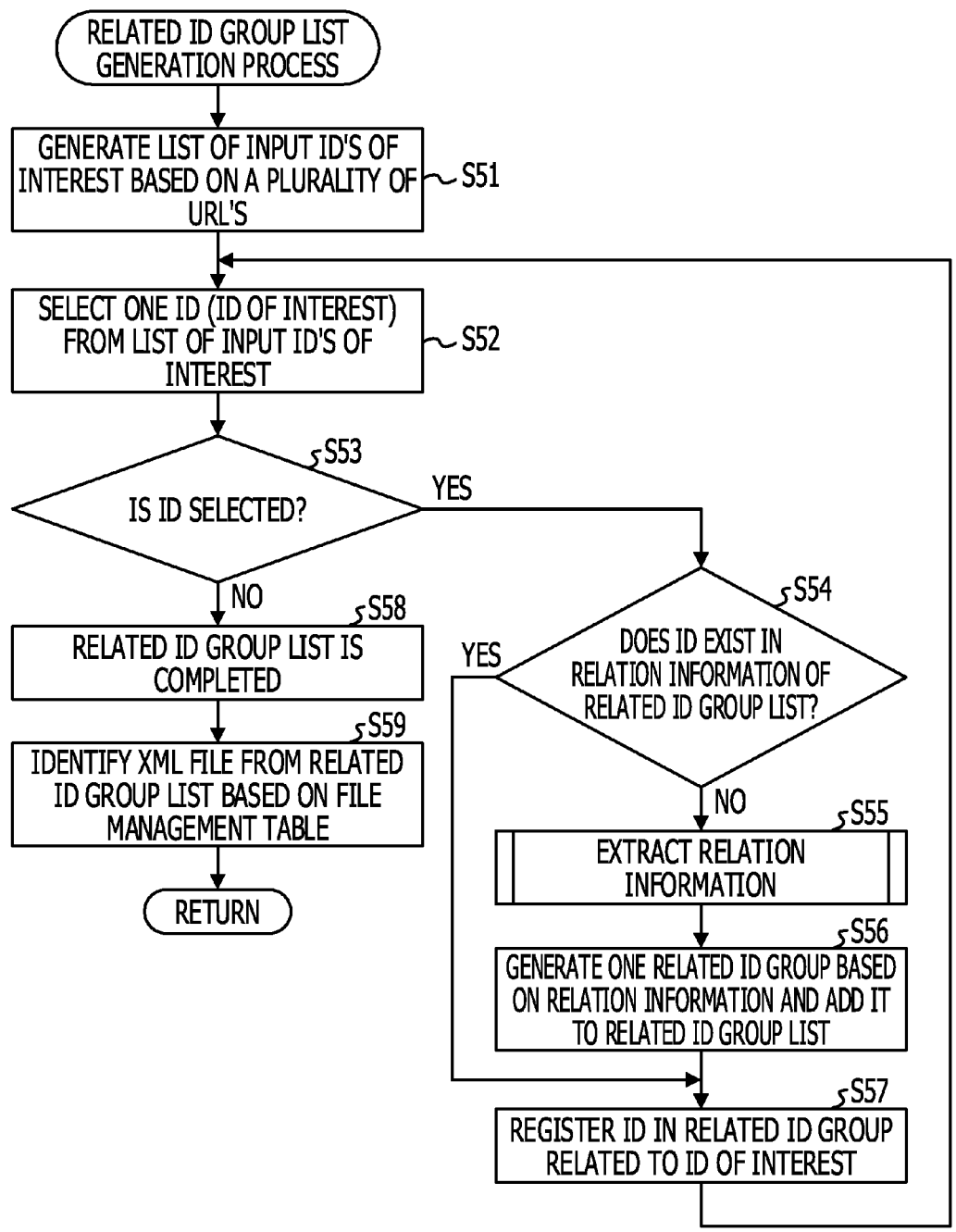
FIG. 10 is an exemplary flow chart illustrating a procedure of a related ID group list generation process.

Next, a procedure of the process of generating the related ID group list associated with the XML file 11 specified to be updated in S31 illustrated in FIG. 8 and a procedure of the process of generating the related ID group list associated with the XML file 11 specified to be deleted in S41 illustrated in FIG. 9 are described below with reference to FIG. 10. FIG. 10 is a flow chart illustrating the procedure of the related ID group list generation process.

First, the relation extraction unit 24 inputs a plurality of URLs associated with the XML file 11 to be updated or deleted from the file update unit 22 or the file deletion unit 23. The relation extraction unit 24 then generates, on a memory, a list of IDs corresponding to the input URLs (hereinafter, referred to as an input to-be-processed ID list) (S51). More specifically, for example, the relation extraction unit 24 reads out IDs corresponding to the input URLs from the file management table 11 and generates the input to-be-processed ID list from the IDs read out.

Figure 13:
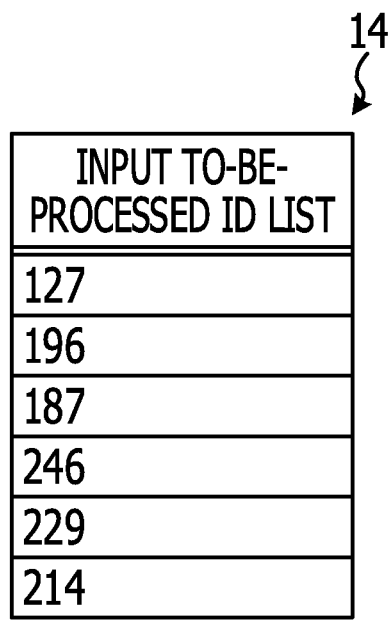
FIG. 13 illustrates an example of an input to-be-processed ID list.

An example of an input to-be-processed ID list is described below with reference to FIG. 13. FIG. 13 is a diagram illustrating the example of the input to-be-processed ID list. In the specific example illustrated in FIG. 13, there are plurality of input-for-check URLs. In this example of the input to-be-processed ID list 14, 127, 196, 187, 246, 229, and 214 are registered as IDs corresponding to the input-for-check URLs.

Referring again to FIG. 10, the relation extraction unit 24 selects one ID (to-be-processed ID) from the input to-be-processed ID list 14 (S52). The relation extraction unit 24 determines whether one ID is selected or not (S53). If it is determined that one ID is selected (that is, when the answer to S53 is Yes), the processing flow proceeds to S54.

In S54, the relation extraction unit 24 determines whether the selected ID is included in relation information of the related ID group list (S54). Note that herein the relation information is information that indicates related IDs related to the to-be-processed ID which has already been processed. For example, in a case where the selection of the ID by the relation extraction unit 24 is performed for the first time, the related ID group list is not yet generated. In this case, the relation information is also not yet generated, and thus the relation extraction unit 24 determines that the selected ID does not exist in the relation information of the related ID group list. On the other hand, in a case where the selection of the ID by the relation extraction unit 24 is performed for the second and following times, the related ID group list is already generated. In this case, the relation extraction unit 24 determines whether the selected ID is included in relation information related to already processed to-be-processed IDs in the related ID group list.

In a case where it is determined that the selected ID does not exist in the relation information of the related ID group list (that is, when the answer to S54 is No), the relation extraction unit 24 extracts relation information related to the selected ID (S55). After the relation information is extracted, the relation extraction unit 24 generates one related ID group based on the extracted relation information and adds the generated related ID group to the related ID group list (S56). Thereafter, the processing flow proceeds to step to S57.

On the other hand, in a case where it is determined that the selected ID exists in the relation information of the related ID group list (that is, when the answer to S54 is Yes), the relation extraction unit 24 advances the process to S57.

In S57, the relation extraction unit 24 registers the selected ID as a to-be-processed ID in the related ID group related to the ID (S57). The relation extraction unit 24 then returns the process to S52 to select a next to-be-processed ID.

Thereafter, if it is determined that no ID is selected from the input to-be-processed ID list (that is, when the answer to S53 is No), the relation extraction unit 24 determines that the generation of the related ID group list is complete (S58). The relation extraction unit 24 then identifies XML files 11 from the completed related ID group list based on the file management table 12 (S59). More specifically, using the file management table 12, the relation extraction unit 24 identifies URLs corresponding to related IDs included in relation information for each related ID group described in the related ID group list. A set of URLs identified for each related ID group defines the range of files that will be affected in the related ID group.

Figure 11:
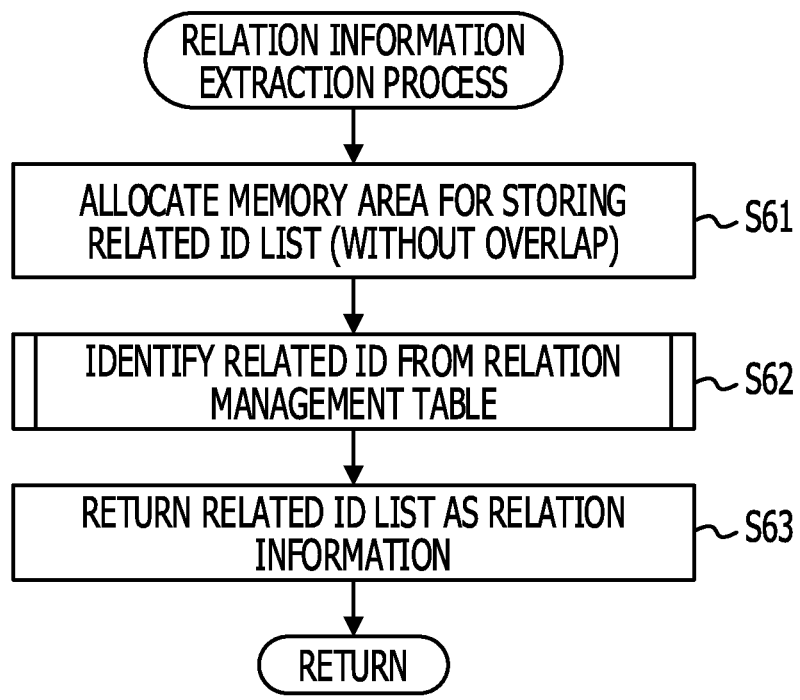
FIG. 11 is a procedure of a process of extracting relation information.

Next, a procedure of the process of extracting relation information in S55 in FIG. 10 is described below with reference to FIG. 11. FIG. 11 is a flow chart illustrating the procedure of extracting relation information.

First, the relation extraction unit 24 inputs IDs to extract relation information. The relation extraction unit 24 allocates a memory area for storing the related ID list (with no data at this stage) (S61). Note that it is assumed that there is no overlap among related IDs registered in the related ID list.

Thereafter, the relation extraction unit 24 identifies related IDs corresponding to the input to-be-processed IDs from the relation management table 13 (S62). More specifically, the relation extraction unit 24 calls a process of identifying a related ID from the relation management table 13 using the selected ID as a parameter. The related IDs identified from the relation management table 13 via the identification process are registered in the related ID list stored in the memory.

The relation extraction unit 24 then returns the related ID list as relation information (S63), and ends the process of extracting relation information.

Figure 12:
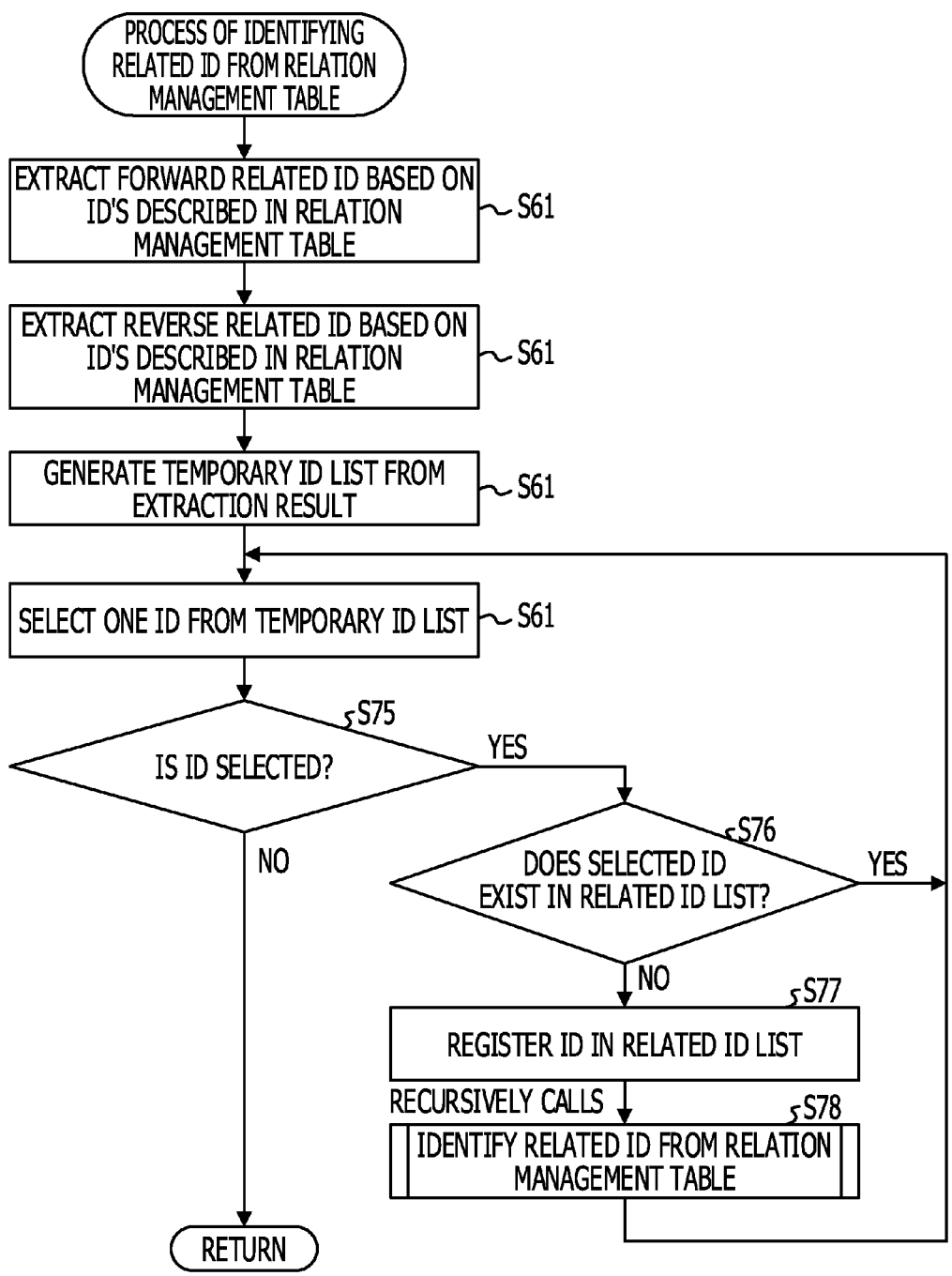
FIG. 12 is a procedure of a process identifying a related ID.

Next, a procedure of the process of identifying related IDs from the relation management table in S62 in FIG. 11 is described below with reference to FIG. 12. FIG. 12 is a flow chart illustrating the procedure of the process of identifying related IDs from the relation management table.

First, the relation extraction unit 24 inputs IDs to be processed. Using the input to-be-processed IDs, the relation extraction unit 24 extracts forward related IDs from the relation management table 13 (S71). More specifically, for example, the relation extraction unit 24 extracts a related ID indicated by "to" 13*b* in a record having a value of "from" 13*a* equal to an input ID from the relation management table 13, thereby extracting a forward related ID.

Furthermore, using the input IDs, the relation extraction unit 24 extracts reverse related IDs from the relation management table 13 (S72). More specifically, for example, the relation extraction unit 24 extracts a related ID indicated by "from" 13*a* in a record having a value of "to" 13*b* equal to an input ID from the relation management table 13, thereby extracting a reverse related ID.

Thereafter, from the extracted result, the relation extraction unit 24 generates a temporary ID list (S73). More specifically, the relation extraction unit 24 registers the forward related IDs and the reverse related IDs related to the input to-be-processed IDs in the temporary ID list.

The relation extraction unit 24 then selects one ID from the temporary ID list (S74). The relation extraction unit 24 determines whether one ID is selected or not (S75). If it is determined that one ID is selected (that is, when the answer to S75 is Yes), the processing flow proceeds to step to S76.

In S76, the relation extraction unit 24 determines whether the selected ID exits in the related ID list (S76). If it is determined that the selected ID exists in the related ID list (that is, when the answer to S76 is Yes), it means that this ID is already identified as a related ID, and thus the relation extraction unit 24 advances the process to S74 to select a next ID.

On the other hand, in a case where it is determined that the selected ID does not exist in the related ID list (that is, when the answer to S76 is No), the relation extraction unit 24 registers the ID in the related ID list (S77). Furthermore, from the relation management table 13, the relation extraction unit 24 identifies a related ID corresponding to the selected ID (S78). More specifically, the relation extraction unit 24 recursively calls the process of identifying a related ID from the relation management table 13 using the selected ID as a parameter. The related ID identified from the relation management table 13 via the identification process is registered in the related ID list. That is, the relation extraction unit 24 extracts not only IDs directly related to the to-be-processed IDs being processed but also indirectly related IDs via the recursive extraction. The relation extraction unit 24 then returns the process to S74 to select a next ID.

In a case where it is determined in S75 that no ID is selected from the temporary ID list (that is, when the answer to S75 is No), the relation extraction unit 24 ends the process of identifying related IDs from the relation management table 13.

Figure 14:
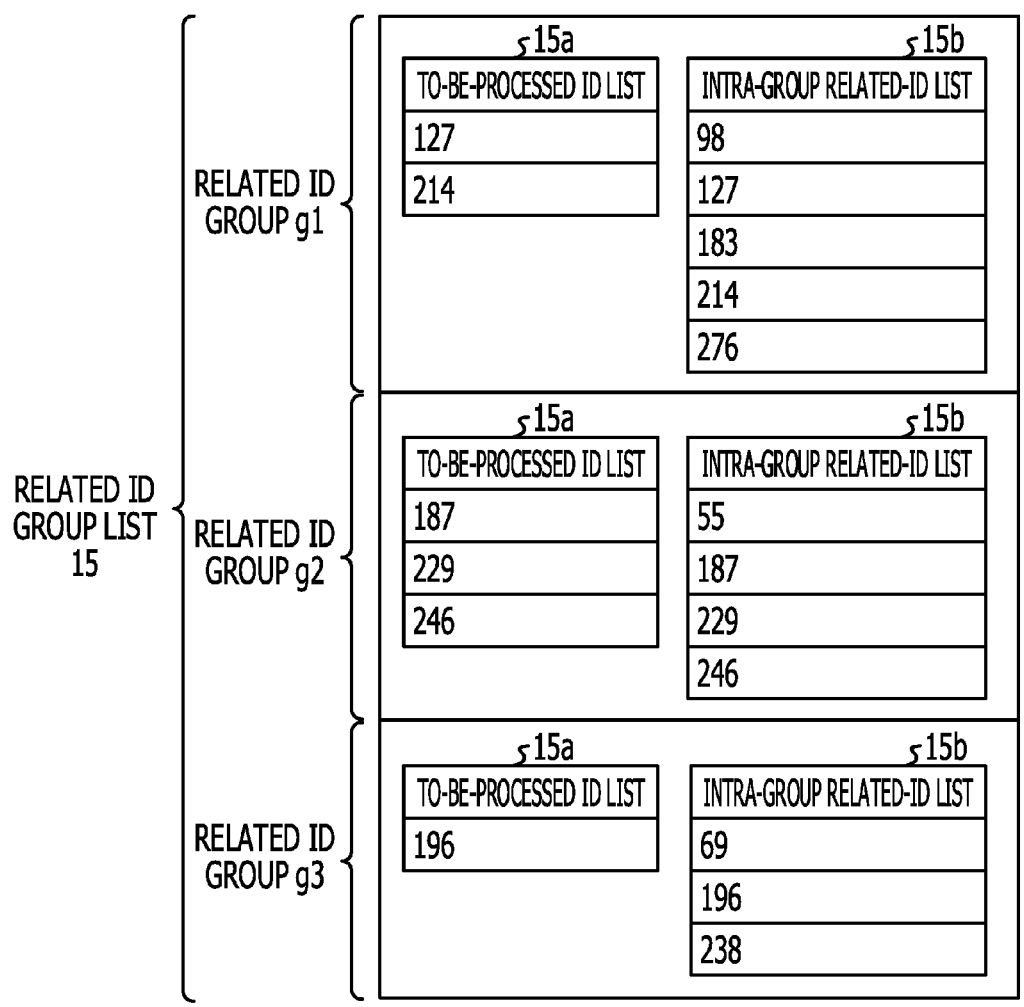
FIG. 14 illustrates an example of a related ID group list.

Next, an example of a related ID group list is described below with reference to FIG. 14. FIG. 14 is a diagram illustrating the example of the related ID group list. In the example illustrated in FIG. 14, a related ID group list 15 includes a plurality of related ID groups g1 to g3. In each of the related ID groups g1 to g3, a to-be-processed ID list is stored in association with a related-in-group ID list 15b. To-be-processed IDs are stored in each to-be-processed ID list 15a. Related IDs related to the respective to-be-processed IDs are stored in each related-in-group ID list 15b. Note that the related ID groups g1 to g3 are generated in S56 of the related ID group list generation process, and the to-be-processed ID list 15a are generated in S57 of the related ID group list generation process. The related-in-group ID lists 15b are generated in S56 of the related ID group list generation process based on relation information extracted in the relation information extraction process (S55).

For example, in the related ID group g1, "127" and "214" are stored in the to-be-processed ID list 15a, and "98", "127", "183", "214", and "276" are stored in the related-in-group ID list 15b. That is, the relation extraction unit 24 extracts relation information related to the to-be-processed ID "127" and generates the related-in-group ID list 15b in the related ID group g1 based on the extracted relation information. Note that in the present example, the to-be-processed ID "127" is included in the related-in-group ID list 15b because the ID "127" is extracted as a related ID related to another ID via the recursive extraction process. On the other hand, the to-be-processed ID "214" is included in the related-in-group ID list 15b in the related ID group g1, and thus the to-be-processed ID "214" is included in the related ID group g1 in which the to-be-processed ID "127" is included.

As in the example illustrated in FIG. 14, the relation extraction unit 24 generates the related ID groups g1 to g3 such that related IDs related to respective to-be-processed IDs are grouped in the corresponding related ID groups g1 to g3. In this state, when, for example, a XML file 11 with an ID of "127" is updated, it is sufficient for the file update unit 22 to check the data consistency on the exclusively locked XML files 11 in the related ID group g1 related to the ID of "127", which results in a reduction in processing load in the updating process.

Figure 15:
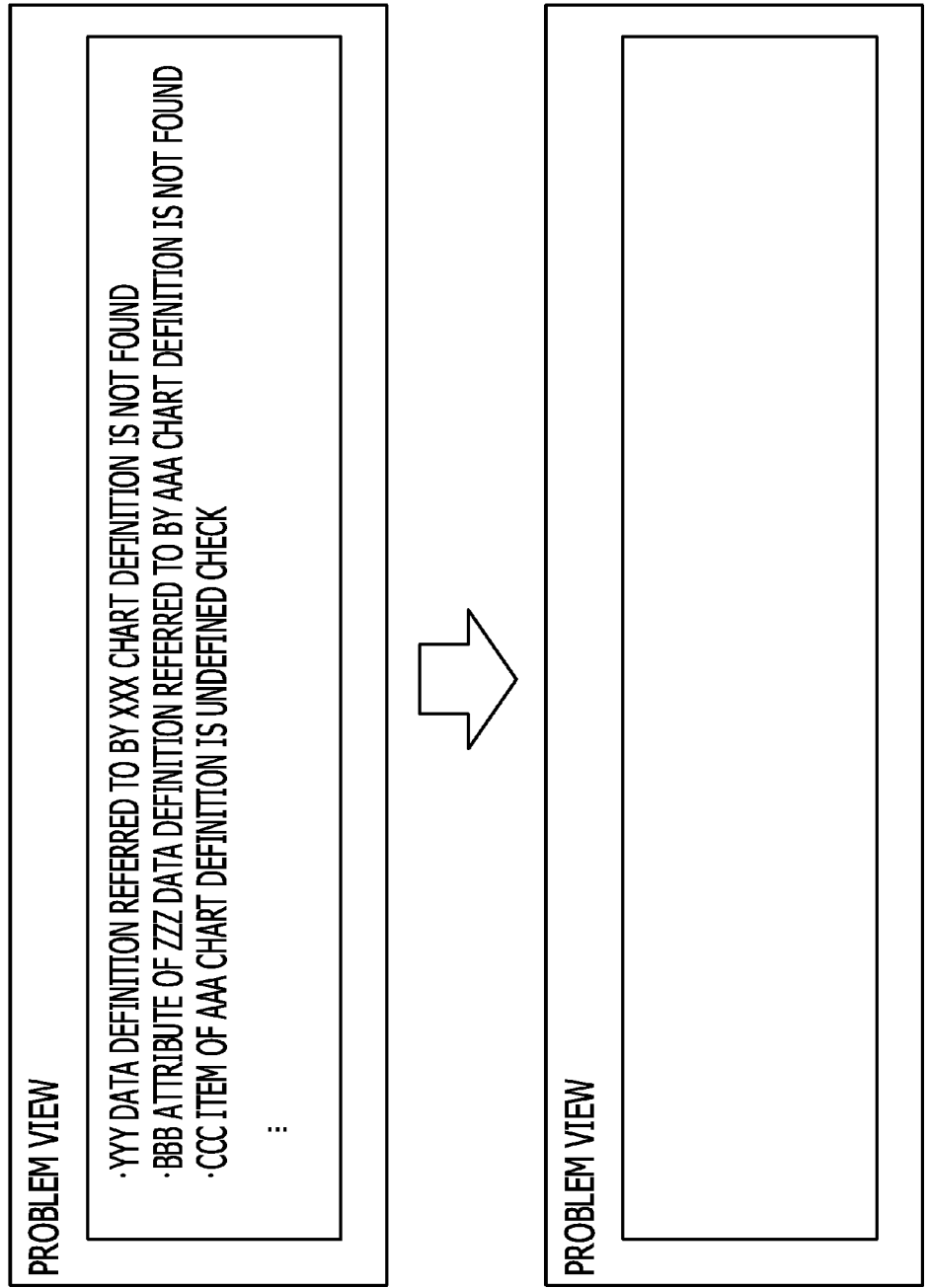
FIG. 15 illustrates an example of an output of a result of a consistency check.

Next, an example of an output of a result of the consistency check is illustrated with reference to FIG. 15. FIG. 15 is a diagram illustrating the example of the output of the result of consistency check. In an upper part of FIG. 15, an example of an output is illustrated for a case where a problem occurs in consistency check, while an example of an output is illustrated, in a lower part of FIG. 15, for a case where no problem occurs in the consistency check.

For example, when the file update unit 22 updates a definition of one of XML files 11, if inconsistency is detected in the consistency check, then a reason for the inconsistency is output to a user terminal 2. In the example illustrated in the upper part of FIG. 15, the file update unit 22 outputs a message "YYY data definition referred to by XXX chart definition is not found" according to a result of the consistency check. The file update unit 22 also outputs a message "BBB attribute of ZZZ data definition referred to by AAA chart definition is not found" according to a result of the consistency check. Furthermore, the file update unit 22 outputs a message "CCC item of AAA chart definition is undefined" according to a result of the consistency check.

Thereafter, if the problem pointed out in the output is solved, the file update unit 22 again updates the definition that encountered the problem. If there is no longer problem, then the file update unit 22 updates the definition, and the file update unit 22 outputs a message indicating successful completion of the update to a user terminal 2. In an example illustrated in a lower part of FIG. 15, there is no problem, and thus the file update unit 22 outputs a message indicating that there is no problem.

According to the embodiment described above, when the image management apparatus 1 updates one of the plurality of files (for example, XML files 11) directly or indirectly related to each other, the image management apparatus 1 identifies files that will be affected by the updating of the file based on the relations in reference between files. When the image management apparatus 1 deletes one of the plurality of files (for example, XML files 11) directly or indirectly related to each other, the image management apparatus 1 identifies files that will be affected by the deleting of the file based on the relations in reference between files. The image management apparatus 1 then checks the data consistency between the particular XML file 11 and the identified XML files 11. In the image management apparatus 1 according to the embodiment described above, by providing the process of identifying files that will be affected by updating (or deleting) of a particular file, it becomes sufficient to perform the data consistency check only within the identified range, and thus it becomes possible to reduce the processing load in updating (or deleting) the file.

According to the embodiment described above, the image management apparatus 1 includes the relation management table 13 in which IDs of referred-to-by files are stored in association with corresponding IDs of referred-to files thereby to manage relations between files. The image management apparatus 1 extracts IDs of referred-to-by files and IDs of referred-to files corresponding to an ID of a particular file from the relation management table 13 thereby identifying files that may be affected. This technique makes it possible for the image management apparatus 1 to easily identify files that may be directly affected when a particular file is updated (or deleted).

According to the embodiment described above, the image management apparatus 1 further recursively extracting IDs of referred-to-by files and IDs of referred-to files corresponding to the already extracted IDs of files thereby further identifying files that may be affected. This technique makes it possible for the image management apparatus 1 to easily identify files that may be indirectly affected when a particular file is updated (or deleted).

According to the embodiment described above, the image management apparatus 1 stores identified IDs of files without overlap. By storing IDs of files related to a particular file without overlap in the above-described manner, it becomes possible for the image management apparatus 1 to directly mange the stored IDs in terms of the relations to the particular file.

According to the embodiment described above, the image management apparatus 1 exclusively locks identified files and a particular file and checks data consistency of the exclusively locked files. In this technique according to the embodiment described above, when a particular file is updated (or deleted), the image management apparatus 1 narrows the range of files to be exclusively locked, and checks the data consistency within the narrowed range, and thus it becomes possible to reduce the processing load in checking the consistency, which results in a reduction in update processing time. Therefore, when the image management apparatus 1 is used in a multi-user circumstance, the image management apparatus 1 is capable of minimizing obstruction in multi-user operation.

In the embodiments described above, it is assumed that the image management apparatus 1 manages information including definition information, document, or the like formed by a plurality of XML file 11 related to each other. However, units of information are not limited to XML files 11. For example, units of information may be units of simple files or documents, or a mixture of files and documents. That is, information may be given in a plurality of arbitrary units as long as a single piece of information is formed by units related to each other.

Furthermore, in the embodiments described above, it is assumed that entities of XML files 11 are stored in the storage unit 10 of the image management apparatus 1. However, entities of XML files 11 are not limited to those described above. For examples, entities may be stored in a server on a network.

The image management apparatus 1 may be realized by implementing functions including a function of the storage unit 10, a function of the control unit 20, and the like described above in an information processing apparatus such as a personal computer, a workstation, or the like.

Physical configurations of constituent elements of the image management apparatus 1 are not limited to those illustrated in figures. That is, the specific manner in terms of integration or division of the constituent elements of the image management apparatus 1 is not limited to that described above. Part of all of constituent elements of the image management apparatus 1 may be divided or integrated in arbitrary units of functional or physical functions depending on loads, a usage situation, and the like. For example, the file update unit 22, the relation extraction unit 24, the file deletion unit 23, and the relation extraction unit 24 may be integrated into a single unit. In another example, the relation extraction unit 24 may be divided into a first extraction unit that extracts forward related IDs and reverse related IDs and a second extraction unit that extracts other related IDs. In another example, the storage unit 10 including the file management table 12, the relation management table 13, etc. may be disposed as an external apparatus and may be coupled to the image management apparatus 1 via a network.

One or more processes in the embodiments described above may be realized by executing one or more prepared programs on a computer such as a personal computer or a workstation. A description is given below as to an example of a computer configured to execute an information management program to realize similar functions to those of the image management apparatus 1 illustrated in FIG. 1. FIG. 16 is a diagram illustrating the example of the computer configured to execute the information management program.

As illustrated in FIG. 16, the computer 200 includes a CPU 203 that executes various operations and processes, an input device 215 that accepts an input of data given by a user, and a display control unit 207 that controls a display apparatus 209. The computer 200 further includes a drive 213 that reads the program or the like from a storage medium, and a communication control unit 217 that transmits and receives data to or from another computer via a network. The computer 200 also includes an HDD 205 and a memory 201 that temporarily stored various kinds of information. The memory 201, the CPU 203, the HDD 205, the display control unit 207, the drive 213, the input device 215, and the communication control unit 217 are coupled to each other via a bus 219.

The drive 213 is an apparatus configured to drive a removable disk 211 or the like. The HDD 205 stores an information management program 205a and information management information 205b.

The CPU 203 is an example of a processor. The processor is a hardware to carry out operations based on at least one program (such as the information management program) and control other hardware, such as the CPU 203, a GPU (Graphics Processing Unit), FPU (Floating point number Processing Unit) and DSP (Digital signal Processor). The CPU 203 reads out the information management program 205a and installs the information management program 205a as an information management program 201a in the memory 201. The CPU 203 then executes the information management program 201a installed in the memory 201 thereby performing an information management process, so as to implement respective functions by means of the file registration unit 21, the file update unit 22, the file deletion unit 23 and the relation extraction unit 24.

The information management program 201a corresponds to the functional units of the control unit 20. The information management information 205b corresponds to the XML files 11, the file management table 12 and the relation management table 13.

Note that the information management program 205a may not be stored in the HDD 205 from the beginning. For example, the information management program 205a may be stored in a portable physical medium configured to be inserted into the computer 200, such as a flexible disk (FD), a CD-ROM, a DVD disk, a magneto-optical disk, an IC card, etc. The computer 200 may read out the information management program 205a from the portable physical medium and execute the information management program 205a.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A management apparatus comprising:
a processor coupled to a memory and configured to:
when a first file is to be updated or to be deleted, identify a second file that has a reference relation with the first file by referring to correspondence information indicating a correspondence between a referred-to-by file and a referred-to file,
check a consistency between the second file and the first file, and
update or delete the first file only when the consistency between the second file and the first file is confirmed.
2. The management apparatus according to claim 1, wherein the processor is configured to identify another second file by recursively referring to the correspondence information.

3. The management apparatus according to claim 2, wherein the processor is further configured to store identifiers corresponding to the second file and the another second file without overlap.

4. The management apparatus according to claim 1, wherein the processor is further configured to:
 exclusively lock the first file and the second file, and
 check consistency of the exclusively locked files.

5. A management method comprising:
 when a first file is to be updated or deleted, identifying a second file that has a reference relation with the first file by referring to correspondence information indicating a correspondence between a referred-to-by file and a referred-to file, by a processor;
 checking a consistency between the second file and the first file; and
 updating or deleting the first file only when the consistency between the second file and the first file is confirmed.

6. The management method according to claim 5, further comprising:
 identifying another second file by recursively referring to the correspondence information.

7. The management method according to claim 6, further comprising:
 storing identifiers corresponding to the second file and the another second file without overlap.

8. The management method according to claim 5, further comprising:
 exclusively locking the first file and the second file; and
 checking consistency of the exclusively locked files.

9. A non-transitory computer-readable recording medium storing management program that causes a computer to execute a process, the process comprising:
 when a first file is to be updated or deleted, identifying a second file that has a reference relation with the first file by referring to correspondence information indicating a correspondence between a referred-to-by file and a referred-to file;
 checking a consistency between the second file and the first file; and
 updating or deleting the first file only when the consistency between the second file and the first file is confirmed.

10. The recording medium according to claim 9, the process further comprising:
 identifying another second file by recursively referring to the correspondence information.

11. The recording medium according to claim 10, the process further comprising:
 storing identifiers corresponding to the second file and the another second file without overlap.

12. The recording medium according to claim 9, the process further comprising:
 exclusively locking the first file and the second file; and
 checking consistency of the exclusively locked files.

* * * * *